(12) United States Patent
Kirschbaum et al.

(10) Patent No.: US 12,423,550 B2
(45) Date of Patent: Sep. 23, 2025

(54) METHODS RELATING TO USES OF COMMAND CODES AND TO THE ASSOCIATION OF TERMINALS, FIRST TERMINAL, SECOND TERMINAL AND COMMAND CODE MANAGEMENT DEVICE

(71) Applicant: ORANGE, Issy-les-Moulineaux (FR)

(72) Inventors: Patrick Kirschbaum, Chatillon (FR); Halim Bendiabdallah, Chatillon (FR); Romain Carbou, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/175,928

(22) Filed: Feb. 28, 2023

(65) Prior Publication Data

US 2023/0306230 A1    Sep. 28, 2023

(30) Foreign Application Priority Data

Mar. 23, 2022   (FR) ..................................... 2202565

(51) Int. Cl.
*G06K 19/077*    (2006.01)
*G06K 19/06*     (2006.01)

(52) U.S. Cl.
CPC .  *G06K 19/07737* (2013.01); *G06K 19/07749* (2013.01); *G06K 19/06037* (2013.01)

(58) Field of Classification Search
CPC ....... G06K 19/07737; G06K 19/07749; G06K 19/00; G06K 19/06037
USPC ................................ 235/492, 487, 375, 376
See application file for complete search history.

(56) References Cited

U.S. PATENT DOCUMENTS

| | | | |
|---|---|---|---|
| 11,349,981 B1* | 5/2022 | Thirasuttakorn | ....... H04L 65/75 |
| 2007/0251997 A1* | 11/2007 | Brown | .................. G06K 7/0008 |
| | | | 235/380 |
| 2010/0066508 A1 | 3/2010 | Jokinen et al. | |
| 2011/0029677 A1* | 2/2011 | Altmann | ............... H04L 1/1607 |
| | | | 380/42 |

(Continued)

FOREIGN PATENT DOCUMENTS

| | | | | |
|---|---|---|---|---|
| JP | 2011096258 A | * | 5/2011 | ........... G06F 16/435 |
| JP | 2016192761 A | * | 11/2016 | .............. H02J 50/12 |

(Continued)

OTHER PUBLICATIONS

French Search Report and Written Opinion dated Oct. 20, 2022, for corresponding French Application No. 2202565, filed Mar. 23, 2022.

(Continued)

*Primary Examiner* — Edwyn Labaze
(74) *Attorney, Agent, or Firm* — David D. Brush; Westman, Champlin & Koehler, P.A.

(57) ABSTRACT

A command code management method, implemented by a command code management device. The method includes transmitting a command signal to a second terminal that has been associated with a first terminal from which a command code, on which the command signal is based, is received, the command code having been received by the first terminal prior to the transmission and after the association of the first terminal and second terminal. The command codes are thus able to be used more widely, that is to say in particular by terminals not equipped with a reading device such as connected objects, or terminals not equipped with a reproduction device.

11 Claims, 5 Drawing Sheets

(56) References Cited

U.S. PATENT DOCUMENTS

| | | | |
|---|---|---|---|
| 2015/0358810 A1* | 12/2015 | Chao | H04W 4/50 |
| | | | 455/418 |
| 2016/0308858 A1* | 10/2016 | Nordstrom | H04L 9/3228 |
| 2017/0188213 A1* | 6/2017 | Nirantar | H04L 67/564 |
| 2017/0371611 A1* | 12/2017 | Huang | G06F 3/1431 |
| 2018/0234496 A1* | 8/2018 | Ratias | H04L 67/535 |
| 2019/0361694 A1* | 11/2019 | Gordon | G06F 9/452 |
| 2020/0302716 A1* | 9/2020 | Raduchel | H04M 11/025 |

FOREIGN PATENT DOCUMENTS

| | | | | |
|---|---|---|---|---|
| KR | 20170086227 A | * | 7/2017 | H04N 21/4402 |
| WO | 0165393 A1 | | 9/2001 | |
| WO | 2016111916 A1 | | 7/2016 | |

OTHER PUBLICATIONS

English translation of French Search Report and Written Opinion dated Oct. 20, 2022, for corresponding French Application No. 2202565, filed Mar. 23, 2022.

* cited by examiner

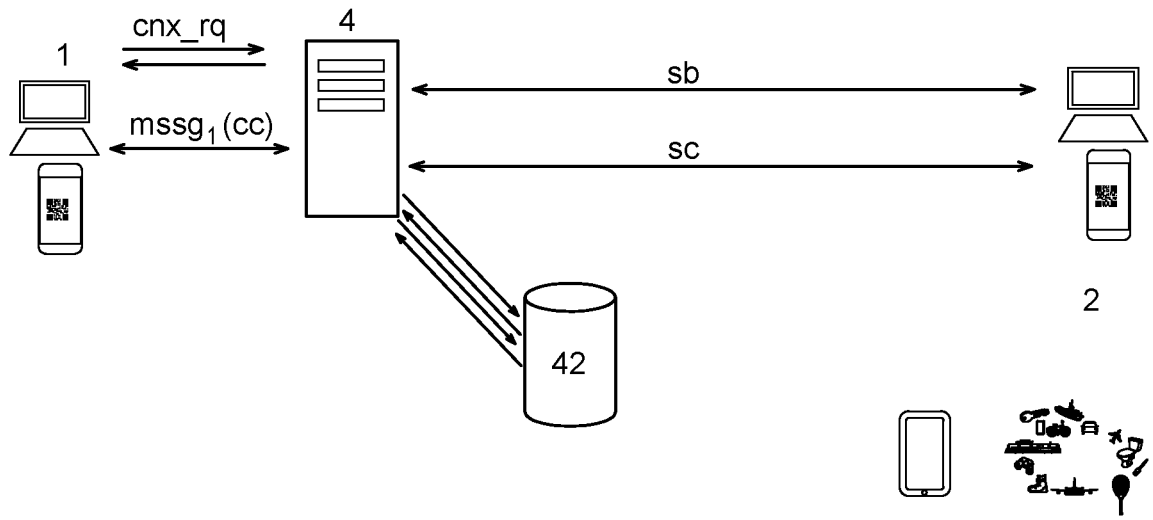
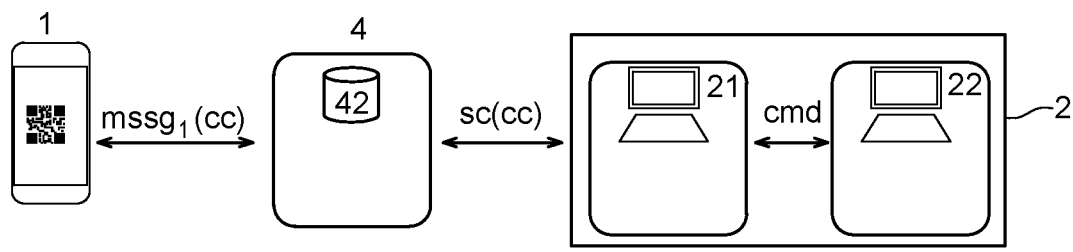
Fig. 5
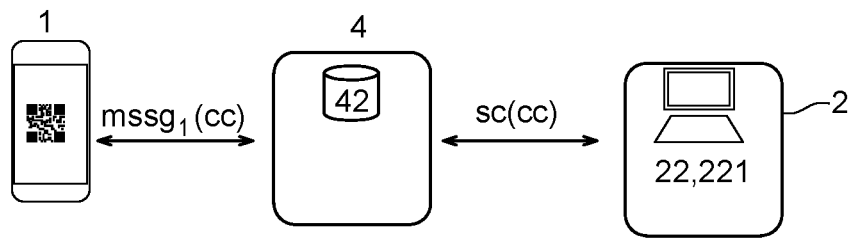
Fig. 6a
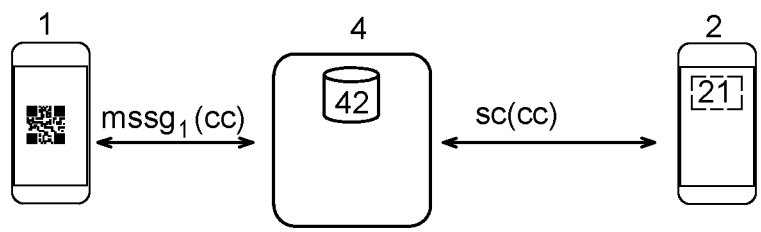
Fig. 6b
Fig. 6c
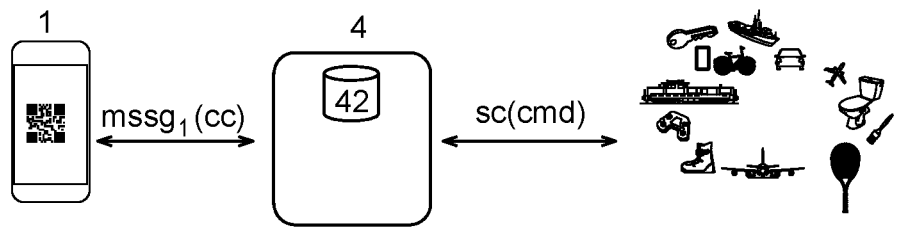
Fig. 6d

METHODS RELATING TO USES OF COMMAND CODES AND TO THE ASSOCIATION OF TERMINALS, FIRST TERMINAL, SECOND TERMINAL AND COMMAND CODE MANAGEMENT DEVICE

TECHNICAL FIELD

The invention relates to command codes and to uses thereof: in particular a read operation and a control operation on the basis of a read command code. Command codes are in particular N-dimensional pictogram codes. The best-known command codes are two-dimensional pictogram codes such as quick-response codes, in particular QR (quick-response) codes, Flashcodes™ or 2D-DOC codes.

PRIOR ART

At present, QR codes, Flashcodes™ and 2D-DOC codes are captured and decoded by one and the same terminal, which comprises a code reader that decodes the code immediately after having read it. Reading of codes thus rapidly triggers, on the terminal, the implementation of a command such as actions of browsing on the Internet (visiting a website, bookmarking an Internet address, displaying a point on a map, etc.), of reading an online multimedia content item, of connecting to an access point of a local area network (Wi-Fi terminal for example), triggering a call or sending a message (SMS, email, etc.), managing contacts/a diary (addition, modification, etc.), activating a payment, etc.

However, the terminal reading the command code is not always the one best suited to implementing the commands: connection resources, reproduction resources, resources for implementing processes, etc. Indeed, it is more practical and amenable, in the most common case of accessing a webpage, to be able to manage said webpage directly on the screen of a computer in its OS environment.

And, conversely, the terminal best suited to implementing the command in a command code is not always the one best suited to reading a command code, in particular the terminal will not be mobile (desktop computer, television set, etc.), or even if it is, it may be tricky to handle for the purpose of capturing the command code, making it impossible for these terminals to read certain command codes (for example handling a tablet, a laptop computer is trickier than handling a smartphone).

In addition, a terminal that will not be equipped with a human-machine interface, in particular with a camera and/or a command processor, will therefore not be able to be equipped with a command code reader and will therefore not be able to be controlled by way of such command codes; this is particularly the case for a large number of connected objects: key rings, watches, thermostats, lightbulbs, etc.

Although there are a plethora of applications for managing their mobile telephone from a local computer, these applications specific to the mobile telephone allow the user only to control their mobile telephone from an interface specific to the mobile telephone and displayed by the computer.

SUMMARY OF THE INVENTION

One of the aims of the present invention is to rectify some drawbacks/deficiencies of the prior art/to make improvements to the prior art.

One subject of the invention is a command code management method, implemented by a command code management device, comprising transmitting a command signal to a second terminal that has been associated with a first terminal from which a command code, on which the command signal is based, is received, the command code having been received by the first terminal prior to the transmission and after the association of the first terminal and second terminal.

The command codes are thus able to be used more widely, that is to say in particular by terminals not equipped with a reading device able to read command codes, such as connected objects, or terminals not equipped with a reproduction device for reproducing the result of an implementation of a command triggered by a command code, such as a command code-reading barcode scanner. And therefore, each action in relation to the command code: reading, implementation, reproduction of a result of a command triggered by a command code is able to be performed by the most appropriate terminal: terminal able to be handled easily so as to read a command code regardless of its location (smartphone, command code reader also called barcode scanner, etc.), and terminal comprising a screen or even a screen of more appropriate size.

Advantageously, the command signal comprises one of the following data:
the received command code,
a command for a component of the second terminal, the command being determined by decoding the received command code.

Thus, in the first option, the command code is decoded by the second terminal. This allows limited use of network resources, since only the command code is transmitted over the network between the command code management device and the second terminal, and makes it possible to limit the use of computing resources of the command code management device since the command code is decoded by the second terminal.

The second option for its part makes it possible to use the command code to command second terminals not equipped with a command code decoder, in particular connected objects, in particular when the second terminal has limited computing resources not allowing a command code decoder to be implemented. The command code decoder is thus transferred to the command code management device, implemented in particular in a connected object mediation server able to remotely control connected objects.

Another subject of the invention is a control method implemented by a second terminal that has been associated with a first terminal from which a command code is received by a command code management device, on which command code a command signal is based, comprising receiving the command signal from the command code management device, the command code having been received by the first terminal prior to the transmission and after the association of the first terminal and second terminal.

Advantageously, the control method comprises decoding a command code, the received command signal comprising the command code transmitted beforehand by the first terminal to the command code management device.

Another subject of the invention is a command code reading method, implemented by a first terminal, comprising the first terminal transmitting a command code to a command code management device, the transmission being triggered by the first terminal receiving the command code, the command code transmitted by the first terminal triggering transmission, by the command code management device, of a command signal to a second terminal that has been associated with a first terminal from which a command code, on which the command signal is based, is received, the command code having been received by the first terminal prior to the transmission and after the association of the first terminal and second terminal.

Another subject of the invention is a method for installing associated terminals by a command code management device comprising:
  loading a control process to a second terminal,
  loading a remote read process to a first terminal, and
  registering associated terminals, comprising the first terminal and the second terminal, the registering being performed prior to the first terminal receiving command codes.

Advantageously, the loading of a control process to the second terminal triggers transmission by the second terminal of the associated terminals to the command code management device.

Advantageously, the method for installing associated terminals comprises transmitting an installation signal to the first terminal of the associated terminals, the installation signal making it possible for the command code management device to load a remote read process to the first terminal.

Another subject of the invention is a method for associating terminals processing command codes, implemented by a second terminal, the associating method comprising:
  associating a first terminal and the second terminal, forming associated terminals, and
  transmitting the associated terminals to a command code management device prior to the first terminal receiving a command code.

Advantageously, according to one implementation of the invention, the various steps of the method according to the invention are implemented by software or a computer program, this software comprising software instructions intended to be executed by a data processor of a device forming part of a first terminal and/or a second terminal and/or a command code management device and being designed to command the execution of the various steps of this method.

The invention therefore also targets a program comprising program code instructions for executing the steps of the command code management method, and/or of the control method, and/or of the command code reading method, and/or of the installation method, and/or of the associating method when said program is executed by a processor.

This program may use any programming language, and be in the form of source code, object code, or intermediate code between source code and object code, such as in a partially compiled form, or in any other desirable form.

One subject of the invention is a command code management device, comprising a transmitter for transmitting a command signal to a second terminal that has been associated with a first terminal from which a command code, on which the command signal is based, is received, the command code having been received by the first terminal prior to the transmission and after the association of the first terminal and second terminal.

Advantageously, the command code management device comprises:
  a process loader, able to load a control process to a second terminal and a remote read process to a first terminal; and
  a register for registering associated terminals, comprising the first terminal and the second terminal, the registering being performed prior to the first terminal receiving command codes.

Another subject of the invention is a second terminal that has been associated with a first terminal from which a command code is received by a command code management device, on which command code a command signal is based, comprising a receiver for receiving the command signal from the command code management device, the command code having been received by the first terminal prior to the transmission and after the association of the first terminal and second terminal.

Advantageously, the second terminal comprises a coupler able to associate a first terminal and a second terminal, forming associated terminals, and to transmit the associated terminals to a command code management device prior to the first terminal receiving a command code.

Another subject of the invention is a first terminal comprising:
  a command code reader able to receive a read command code, and
  a command code transmitter for transmitting command codes to a command code management device,
  the command code reader commanding the command code transmitter upon receipt of a command code,
  the command code transmitted by the first terminal triggering transmission, by the command code management device, of a command signal to a second terminal that has been associated with a first terminal from which a command code, on which the command signal is based, is received, the command code having been received by the first terminal prior to the transmission and after the association of the first terminal and second terminal.

BRIEF DESCRIPTION OF THE DRAWINGS

The features and advantages of the invention will become more clearly apparent upon reading the description, given by way of example, and the related figures, in which:

FIG. 5 shows a simplified drawing of a transfer of a command code from a first terminal to a second terminal according to the invention, FIG. 6a shows a simplified drawing of a transfer of a command code comprising an Internet address from a first mobile terminal to a second computer terminal implementing a device/application for receiving and decoding the command code according to the invention, FIG. 6b shows a simplified drawing of a transfer of a command code comprising an Internet address from a first mobile terminal to a second computer terminal implementing an Internet browser comprising a device/plug-in for receiving and decoding the command code according to the invention, FIG. 6c shows a simplified drawing of a transfer of a command code from a first mobile terminal to a second mobile terminal implementing a device/application for receiving and decoding the command code according to the invention, FIG. 6d shows a simplified drawing of a transfer of a command code from a first mobile terminal to a second connected object terminal, the command code management device comprising a mediation server for the Internet of Things for commanding the connected objects on the basis of the command code according to the invention.

DESCRIPTION OF THE EMBODIMENTS

A command code is understood to mean a representation, in particular a graphical representation, of a technical datum such as an Internet address, a connection identifier (telephone number, IP address, etc.), a password for connection to an access point or to a communication terminal (Wi-Fi, Bluetooth passwords, etc.), a message including a command message (in particular SMS, MMS, IM, etc.), etc.

Figure 1:
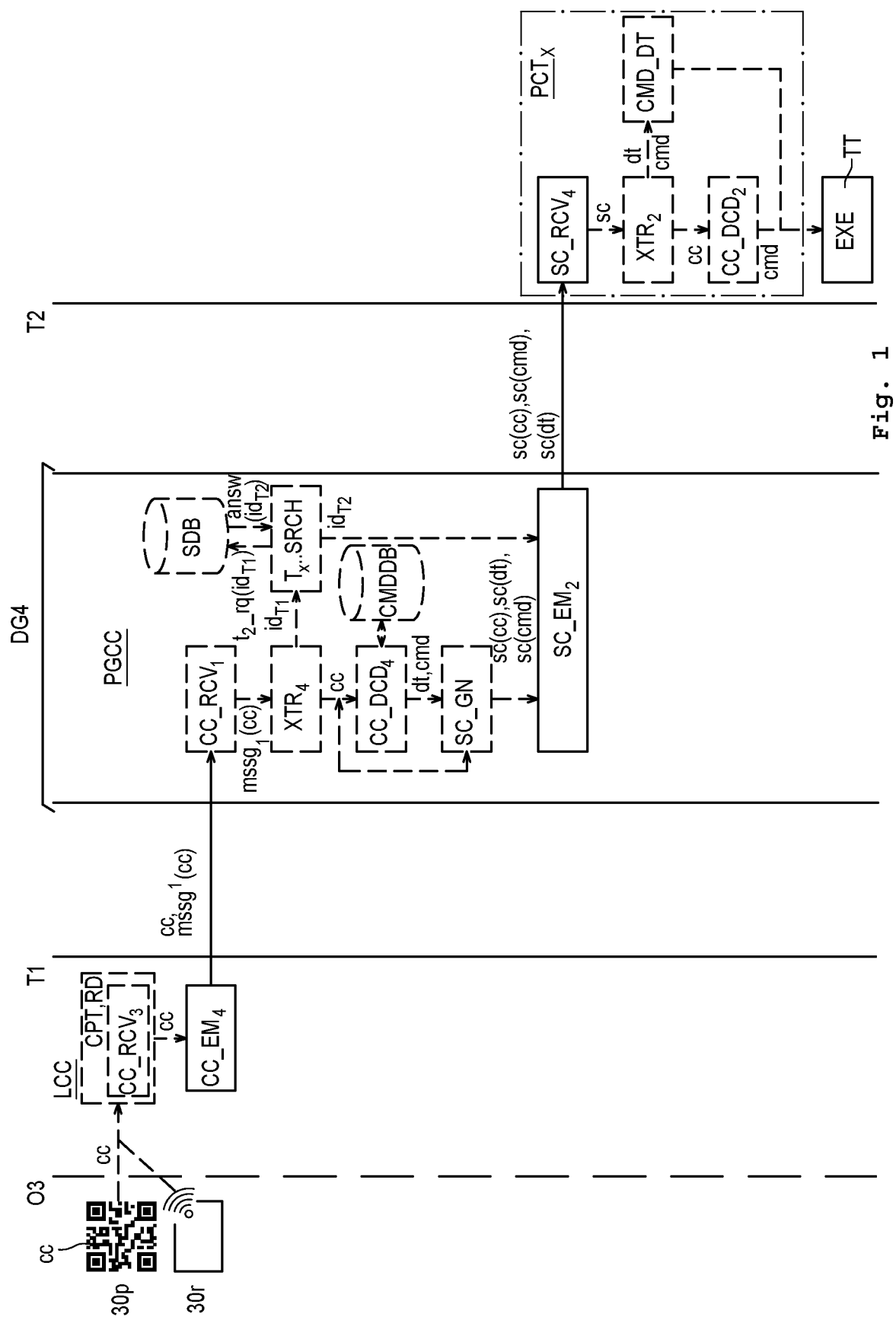
FIG. 1 shows a simplified drawing of a diagram of the use of a command code according to the invention.

FIG. 1 illustrates a simplified drawing of a diagram of the use of a command code according to the invention.

The command code cc is read LCC by a first terminal T1, managed PGCC by a command code management device DG4 placed as an intermediary between the first terminal T1 and a second terminal T2, and triggers implementation of a command based on the command code PCTx in the second terminal T2. The first terminal T1, the second terminal T2 and the management device DG4 are separate devices. The management device DG4 is in particular connected to the first terminal T1 and to the second terminal T2 via one or more communication networks.

One embodiment of the use of a command code according to the invention comprises respectively the first terminal T1 implementing a command code reading method LCC, the command code management device DG4 implementing a command code management method PGCC and the second terminal T2 implementing a control method PCTx.

The command code management method PGCC implemented by the command code management device DG4 comprises transmitting a command signal SC_EM2 to a second terminal T2. The command signal sc is based on a command code cc received from a first terminal T1. The command code cc having been received beforehand by the first terminal T1. The first terminal T1 and the second terminal T2 are associated (idT1,idT2) prior to the first terminal T1 receiving CC_RCV3 a command code cc.

In particular, the command signal sc comprises one of the following data:
the received command code cc,
a command cmd for a component of the second terminal T2, the command cmd being determined by decoding CC_DCD4 the received command code cc.

The control method PCTx implemented by a second terminal T2 comprises receiving SC_RCV4 a command signal sc from a command code management device DG4. The command signal sc is based on a command code cc received by the command code management device DG4 from a first terminal T1. The command code cc is received beforehand by the first terminal T1. The first terminal T1 is associated with the second terminal T2 prior to the first terminal T1 receiving CC_RCV3 the command code cc.

In particular, the control method PCTx comprises decoding CC_DCD2 a command code cc. The received command signal sc comprises the command code cc transmitted CC_EM4 beforehand by the first terminal T1 to the command code management device DG4.

The command code reading method LCC implemented by a first terminal T1 comprises the first terminal T1 transmitting CC_EM4 a command code cc to a command code management device DG4. The transmission CC_EM4 is triggered by the first terminal T1 receiving CC_RCV3 the command code cc. The command code cc transmitted by the first terminal T1 triggers transmission CC_EM2, by the command code management device DG4, of a command signal sc to a second terminal T2. The second terminal T2 is associated with the first terminal T1 prior to the first terminal T1 receiving CC_RCV3 the command code.

In particular, the command code reading method LCC comprises the first terminal T1 receiving a command code CC_CRV3 from an object O3.

In a first embodiment, the command code cc is contained in particular in an N-dimensional pictogram reproduced on a third object O3 such as a document 30p (poster; label affixed to an object such as an electronic device, product packaging, etc.; a related work: book, newspaper, magazine, etc.; etc.) or on a screen, in particular of a third object consisting of an electronic device, also called third terminal, such as a communication device: smartphone, television, etc. or a simple electronic display device: monitor, advertising screen, etc. The command code cc is then a graphical representation of a technical datum.

In this first embodiment, the command code reading method LCC comprises in particular the first terminal T1 capturing the command code CPT, comprising the receipt of the command code $CC\_RCV_3$. The capture CPT is in particular a scan, a photographic or video capture, etc. of the pictogram 30p. The receipt of the command code $CC\_RCV_3$ is then respectively the receipt of a document resulting from the scan of the pictogram 30p, of an image resulting from the photographic or video capture of the pictogram 30p, etc. containing the command code included in the pictogram 30p.

In a second embodiment, the command code cc is for example stored in a memory of a short-range communication device 30r, also called third terminal O3. Short-range communications are understood to mean near-field point-to-point communications generally of the order of a cm, such as those used by RFID, NFC, etc. technologies.

The command code stored in the short-range communication device is in particular a graphic code, such as an N-dimensional pictogram.

In this second embodiment, the command code reading method comprises in particular reading of the command code CC_RD, comprising receiving the command code $CC\_RCV_3$. The receipt of the command code $CC\_RCV_3$ is then the receipt of the command code stored in the memory 30r of the third terminal O3. In particular, the reading method CC_RD comprises transmitting RD_EM3 a read request rd_rq (not illustrated) to the third terminal O3. The read request rd_rq is a request able to trigger transmission $CC\_EM_1$ (not illustrated), by the third terminal O3, of the command code cc stored in its memory 30r, in particular to the first terminal T1.

The command code cc received by the first terminal T1 is thus transmitted by the reading method LCC during the transmission $CC\_EM_4$ of the command code to the command code management device DG4, in particular in the form of a first message comprising the command code $msgg_1(cc)$.

In particular, the command code management method PGCC comprises receiving a command code $CC\_RCV_1$ from a first terminal T1 that has received the command code stored in, reproduced by or affixed to a third object O3 such as a third terminal. The receipt of the command code $CC\_RCV_1$ by the management device DG4 in particular consists of the receipt of the first message $msgg_1(cc)$ comprising the command code from the first terminal T1.

In particular, the command code management method PGCC comprises the management device DG4 extracting $XTR_4$ the command code cc from the first message mssg1 (cc) received from the first terminal T1.

The command code management method PGCC possibly comprises the management device DG4 decoding the command code CC_DCD4, which provides the one or more technical data dt encoded in the command code cc, in particular a command cmd. In particular, the decoding CC_DCD4 comprises retrieving a command cmd on the basis of the command code cc or the technical data dt included in the command code from a command base CMDDB.

In particular, the command code management method PGCC comprises generating SC_GN a command signal sc comprising either the command code cc received CC_RCV1 by the management device DG4, or the command code cc extracted $XTR_4$ from the first message mssg1(cc) received CC_RCV1 by the management device DG4, or the one or more technical data dt or the command cmd decoded CC_DCD4 from the command code cc received CC_RCV1 by the management device DG4: sc(cc), sc(dt), sc(cmd).

The command signal thus generated sc(cc), sc(dt), sc(cmd) is transmitted $SC\_EM_2$ to a second terminal T2 associated with the first terminal T1 that received (captured, read) the command code cc.

In particular, the command code management method PGCC comprises searching for associated terminals Tx_SRCH on the basis of the first terminal T1 that transmitted the command code cc, $mssg_1(cc)$. The second terminal T2 is associated with the first terminal T1 prior to the first terminal T1 receiving $CC\_RCV_3$ the command code. The search Tx_SRCH is based in particular on the identifier of the first terminal idT1, and provides a result in the form of an identifier of a second terminal idT2.

Associated terminals atx is understood to mean associated data relating to the associated terminals, such as associated identifiers of the associated terminals and/or associated addresses of the associated terminals, etc.

The search Tx_SRCH is in particular performed in a base of associated terminals SDB. For example, the search Tx_SRCH asks $t_2\_rq(id_{T1})$ the base of associated terminals SDB for the second terminal T2 associated with the first terminal T1 that transmitted the command code cc, and then receives, from the base of associated terminals SDB, a response $answ(id_{T2})$ relating to the second terminal T2 associated with this first terminal T1.

In particular, the extraction $XTR_4$ extracts an identifier of the first terminal $id_{T1}$ from the first received message $mssg_1$ (ccc) and provides said identifier to the search for associated terminals Tx_SRCH.

The second terminal T2 associated with the first terminal T1 thus determined by the search for associated terminals Tx_SRCH is used as recipient for the transmission $SC\_EM_2$ of the command signal sc based on the command code cc received by the first terminal T1.

In particular, the control method PCTx comprises the second terminal T2 extracting $XTR_2$ the content of the command signal sc received from the management device DG4, in particular the command code cc, technical data dt, and the command cmd.

In particular, when the command signal sc received $SC\_RCV_4$ by the second terminal T2 associated with the first terminal T1 that received (captured, read) the stored, reproduced, displayed command code cc comprises the command code cc: sc(cc), the control method PCTx comprises the second terminal T2 decoding the command code $CC\_DCD_2$, which provides the one or more technical data dt encoded in the command code cc, in particular a command cmd. In particular, the decoding $CC\_DCD_2$ comprises retrieving a command cmd on the basis of the command code cc or the technical data dt included in the command code from a command base CMDDB.

In this case, the reading method LCC, management method PGCC and control method PCTx make it possible to transfer a command code cc read/captured by the first terminal T1 to a second terminal T2 associated with this first terminal in order to be used by this second terminal T2 rather than the first terminal T1, as is systematically the case in the prior art: one and the same terminal reading and using the command code.

In particular, when the command signal sc received $SC\_RCV_4$ by the second terminal T2 associated with the first terminal T1 that received (captured, read) the stored, reproduced, displayed command code cc comprises technical data such as an Internet address, a connection identifier, etc., the control method PCTx comprises determining a command CMD_DT on the basis of the technical data. In particular, depending on the type of technical data, the process implemented by the second terminal T2 and/or the component of the second terminal to be commanded is possibly determined using the technical data and then, where appropriate, a command cmd is generated based on the technical data dt and/or on the process or component to be commanded.

The command cmd extracted from the command signal sc(cmd), decoded or determined on the basis of the command signal sc(cc), sc(dt) received by the second terminal T2, is thus implemented EXE by the second terminal T2, in particular through a process TT implemented by or through a component of the second terminal T2.

If the second terminal T2 is a connected object, the management device DG4 consists of or comprises an intermediation server able to command connected objects. The management device DG4 then transmits $SC\_EM_2$ a command signal sc consisting of a command cmd for connected objects based on the command code cc received by the management device DG4 from the first terminal T1.

Figure 2:
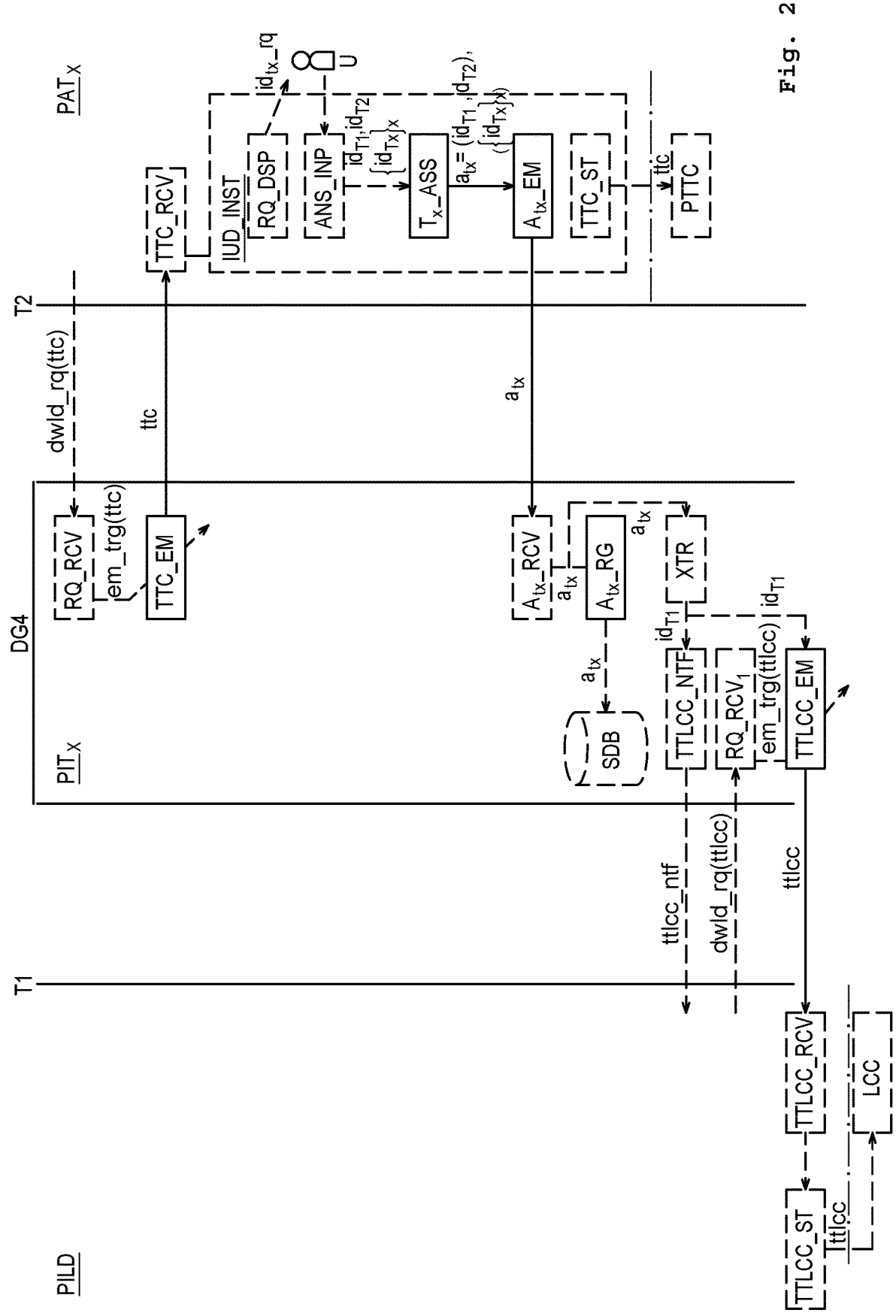
FIG. 2 shows a simplified drawing of a diagram of the registration of the association of terminals for implementation during the use of command codes according to the invention.

FIG. 2 illustrates a simplified drawing of a diagram of the registration of the association of terminals for implementation during the use of command codes according to the invention.

A method for installing associated terminals PITx by a command code management device DG4 comprises:
  loading a control process TTC_EM to a second terminal T2,
  loading a remote read process TTLCC_EM to a first terminal T1, and
  registering Atx_RG associated terminals atx, comprising the first terminal T1 and the second terminal T2.

The associated terminals atx are received Atx_RCV from the second terminal T2. The registration Atx_RG is performed prior to the first terminal T1 receiving CC_RCV₃ command codes cc.

In particular, the loading of a control process TTC_EM to the second terminal T2 triggers transmission Atx_EM by the second terminal T2 of the associated terminals atx to the command code management device DG4.

In particular, the installation method PITx comprises transmitting TTLCC_NTF an installation signal ttlc_ntf to the first terminal T1 of the associated terminals atx. The installation signal ttlcc_ntf allows the command code management device DG4 to load TTLCC_EM a remote read process to the first terminal T1.

In particular, following the transmission TTLCC_NTF of an installation signal ttlc_ntf to the first terminal T1, the installation method PITx comprises receiving RQ_RCV₁ a remote read process load request dwld_rq(ttlcc) from the first terminal T1.

The receipt RQ_RCV₁ of the remote read process load request dwld_rq(ttlcc) from the first terminal T1 triggers em_trg(ttlcc) the loading of the remote read process TTLCC_EM by the management device DG4 to the first terminal T1.

A method for associating terminals PATx processing command codes, implemented by a second terminal T2, comprises:
  associating Tx_ASS a first terminal T1 and the second terminal T2, forming associated terminals atx: for example, atx=(id$_{T1}$, id$_{T2}$), ({idTx}), and
  transmitting Atx_EM the associated terminals to a command code management device prior to the first terminal receiving a command code.

In particular, a control process load request dwld_rq(ttc) is transmitted from the second terminal T2 to the management device DG4, triggering the association of terminals Tx_ASS, in particular of the second terminal T2 with a first terminal T1 for remote use of command codes.

In particular, the method for installing associated terminals PITx implemented by the management device DG4 comprises a request receipt RQ_RCV₂ receiving the control process load request dwld_rq(ttc) from the second terminal T2.

The receipt RQ_RCV₂ of the control process load request dwld_rq(ttc) from the second terminal T2 triggers em_trg (ttc) the loading of the control process TCC_EM by the management device DG4 to the second terminal T2.

In particular, the method for associating terminals PATx comprises the second terminal T2 receiving TTC_RCV the control process ttc from the management device DG4.

In particular, the method for associating terminals PATx comprises installing an interface IUT_INST for the remote use of command codes that associates terminals Tx_ASS and transmits the associated terminals Atx_EM to the management device DG4.

In particular, the method for associating terminals PATx comprises receiving an interaction ANS_INP of a user U comprising data relating to at least one first terminal, in particular identifiers or an address of terminals idT1, {idTx}$_x$, to be associated with the second terminal, or even with one or more additional second terminals to be associated with the first terminal and with the second terminal implementing the method for associating terminals PATx. In particular, installing an interface IUT_INST for the remote use of command codes comprises receiving an interaction ANS_INP of a user U.

In particular, the method for associating terminals PATx comprises reproducing a request RQ_DSP to provide terminals to be associated id$_{tx}$_rq to a user U of the second terminal. The interaction receipt ANS_INP is triggered by the reproduction of a request RQ_DSP, to which the user U responds when interacting by way of a user interface of the second terminal T2. In particular, installing an interface IUT_INST for the remote use of command codes comprises reproducing a request RQ_DSP to provide terminals to be associated.

In particular, installing an interface IUT_INST for the remote use of command codes on the second terminal comprises installing TTC_ST the received control process ttc, then allowing the second terminal to implement the control process ttc by way of the control process method PTCC, possibly as illustrated by FIG. 1.

In particular, the method for installing associated terminals PITx implemented by the management device DG4 comprises receiving Atx_RCV associated terminals atx from the second terminal T2 prior to the registration of the associated terminals Atx_RG.

The associated terminals atx are in particular registered Atx_RG by the management device DG4 in a base of associated terminals SDB, or even a base of subscribers to the service provided by the management device DG4. The management device DG4 provides a service for the remote use of command codes or a service for the use of command codes by a terminal separate from the command code reader, in particular by implementing a command code management method PGCC, for example such as the management method illustrated by FIG. 1.

In particular, the installation signal ttlc_ntf is transmitted TTLCC_NTF by the management device DG4 to a first terminal T1 from among the associated terminals atx received from the second terminal T2 by the management device DG4.

The method for installing associated terminals PITx in particular comprises extracting XTR a first terminal T1 from the associated terminals atx received from the second terminal T2. Where applicable, the extraction XTR extracts the identifier of the first terminal id$_{T1}$. The loading of the remote read process TTLCC_EM, or even where applicable the transmission of the installation signal TTLCC_NTF, is thus carried out to the first terminal T1 extracted XTR from the associated terminals atx received from the second terminal T2.

In particular, a method for installing a remote reading interface PILD is implemented by a first terminal.

In particular, the method for installing a remote reading interface PILD implemented by the first terminal comprises receiving NTF_RCV (not illustrated) an installation signal ttlcc_ntf from a management device DG4. The receipt NTF_RCV of the installation signal triggers, possibly upon condition of validation by the user U of the first terminal, transmission REQ_EM (not illustrated) of a load request or of load consent dwld_rq(ttlcc).

The method for installing a remote reading interface PILD comprises receiving TTLCC_RCV a remote command code read process ttlcc from the management device DG4. The receipt TTLCC_RCV of the remote read process results in particular from the receipt RQ_RCV₁, by the method for installing associated terminals PITx, of a remote read process load request dwld_rq(ttlcc) from the first terminal.

The method for installing a remote reading interface PILD comprises, following the receipt TTLCC_RCV of a remote command code read process, installing TTLCC_ST the remote read process ttlcc, then allowing the first terminal to implement the remote read process ttlcc by way of the reading method LCC, possibly as illustrated by FIG. 1.

In particular, the command code management method PGCC comprises the method for installing associated terminals PITx.

In one particular embodiment, one or more of the methods according to the invention are implemented in the form of one or more programs comprising program code instructions for executing the steps of the command code management method, and/or of the control method, and/or of the command code reading method, and/or of the installation method, and/or of the associating method when said program is executed by a processor.

Figure 3:
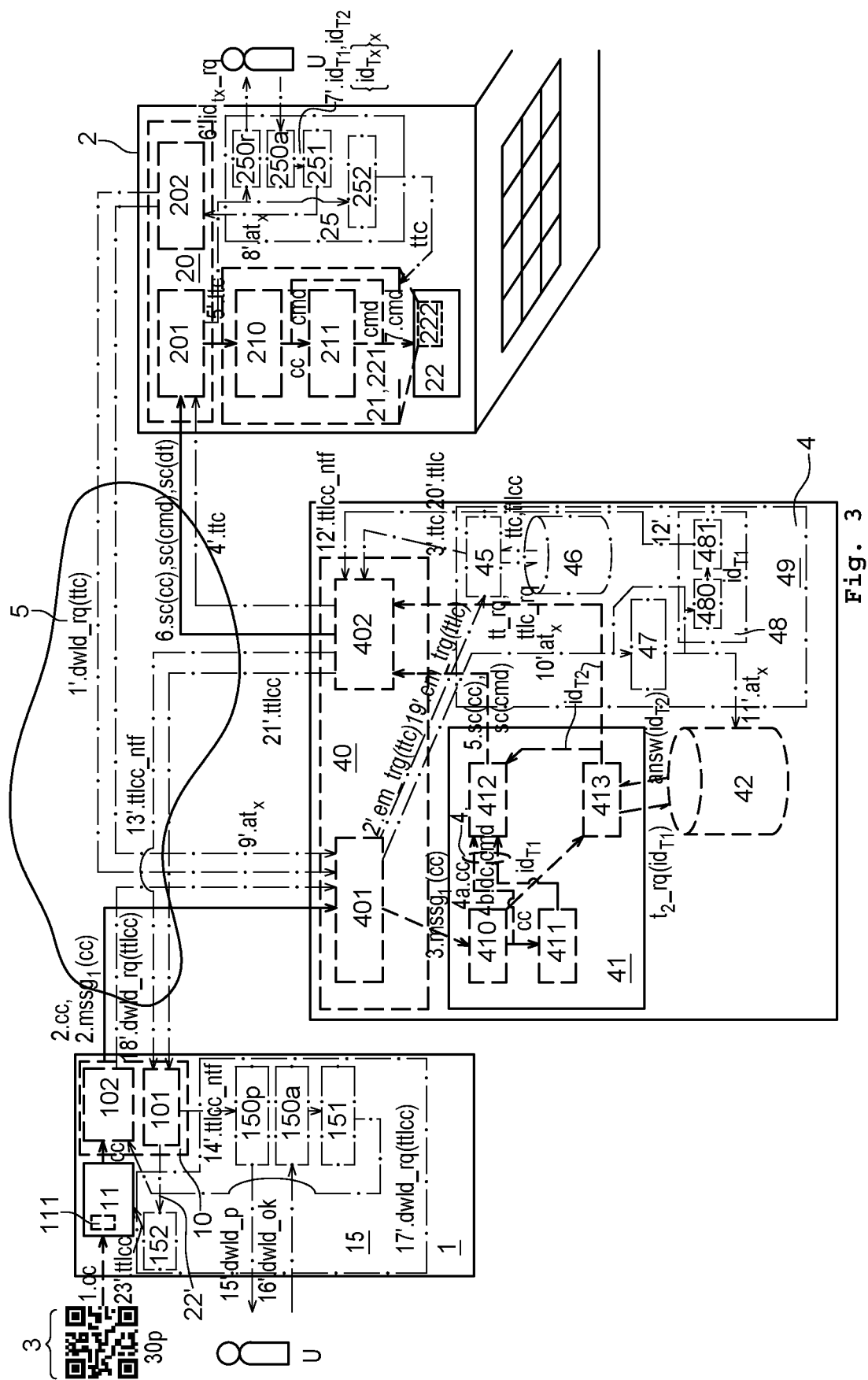
FIG. 3 shows a simplified drawing of a communication architecture comprising the first terminal, the command code management device and the second terminal according to the invention.

FIG. 3 illustrates a simplified drawing of a communication architecture comprising the first terminal, the command code management device and the second terminal according to the invention.

The command code management device 4 comprises a transmitter 40, 402 for transmitting a command signal sc to a second terminal 2. The command signal sc is based on a command code cc received from a first terminal 1. The command code cc is received beforehand by the first terminal 1. The first terminal 1 and the second terminal 2 are associated prior to the first terminal 1 receiving a command code cc.

In particular, the command code management device 4 comprises:
- a process loader 45, able to load a control process ttc to a second terminal 2 and a remote read process ttlcc to the first terminal 1; and
- a register 47 for registering associated terminals atx, comprising the first terminal 1 and the second terminal 2, the associated terminals atx being received from the second terminal 2, the registering being performed prior to the first terminal 1 receiving command codes cc.

In particular, the transmitter 402 of the management device 4 is able to transmit, in addition to the command signal sc to a second terminal 2, the control process ttc to the second terminal 2, but also a remote read process ttlcc to the first terminal 1, or even possibly an installation signal ttlcc_ntf to the first terminal 1.

In particular, the management device 4 comprises a receiver 401. The receiver 401 is able to receive for example a control process load request dwld_rq(ttc) from the second terminal 2, and/or the associated terminals atx from the second terminal 2, and/or a remote read process load request dwld_rq(ttlcc) from the first terminal 1, and/or a command code cc, in particular included in a first message mssg1(cc), from the first terminal 1.

The management device 4 in particular comprises a transmitter device 40 comprising the transmitter 402 and the receiver 401.

In particular, the management device 4 comprises a process base 46 from which the loader 45 retrieves the processes ttc, ttlcc to be transmitted to the second terminal 2 or the first terminal 1, respectively.

In particular, the loader 45 is commanded directly or indirectly by a load request dwld_rq, in particular a load request to load the control process dwld_rq(ttc) or the remote read process dwld_rq(ttlcc), respectively, from the second terminal 2 or from the first terminal 1, respectively. The receiver 401 receiving the load request dwld_rq possibly commands the loader 45, in particular by way of a trigger signal em_trg so as to retrieve the processes ttc, ttlcc.

In particular, the receiver 401 transmits the associated terminals atx received from the second terminal 2 to the register 47.

In particular, the management device 4 comprises a base of associated terminals 42 in which the management device 4 or even the register 47 registers, stores the associated terminals atx received from the second terminal 2.

In particular, the management device 4 comprises a command code reader installation signal provider 481. The installation signal provider 481 transmits, to the transmitter 402, an installation signal for installing the reader to the first terminal 1 from among the associated terminals atx. The management device 4 possibly comprises an extractor 480 able to extract, from the received associated terminals atx, the first terminal 1, in particular an identifier of the first terminal $id_{T1}$.

In particular, the management device 4 comprises a command code reader installation trigger 48. The trigger 48 transmits, to the transmitter 402, an installation signal for installing the reader to the first terminal 1 from among the associated terminals atx, triggering the transmitter 102 of the first terminal 1 to send a remote read process load request dwld_rq(ttlcc) to the management device 4. The trigger 48 comprises in particular the provider 481 and/or the extractor 480.

In particular, the management device 4 comprises an installer for installing associated terminals 49. The installer for installing associated terminals 49 comprises in particular one or more of the following devices:
- the loader 45,
- the process base 46,
- the register 47,
- the base of associated terminals 42,
- the trigger 48,
- the extractor 480,
- the provider 481.

In particular, the management device 4 comprises a command code manager 41 able to trigger the transmission of a command signal sc to the second terminal, in particular by way of the transmitter 402 and/or the transmitter device 40, based on the command code cc received from the first terminal 1 by way of the receiver 401 and/or the transmitter device 40.

In particular, the management device 4 comprises a command code extractor 410 able to extract a command code cc from a first message mssg1 received from the first terminal 1. The command code extractor 410 in particular receives the first message mssg1(cc) comprising the command code from the receiver 401 or from the transmitter device 40 that received the first message mssg1(cc).

In particular, the management device 4 comprises a command code cc decoder 411 able to decode the command code received by the management device 4, in particular by way of the receiver 401 and/or the transmitter device 40, or even extracted from a received first message mssg1, in particular by the command code extractor 410. The decoder 411 determines technical data dt, or even a command cmd, on the basis of the command code cc received by the management device 4.

In particular, the management device 4 comprises a command signal sc generator 412 for generating a command signal on the basis of the command code cc received by the management device 4, in particular by way of the receiver 401 and/or the transmitter device 40, or even extracted from a received first message mssg1, in particular by the command code extractor 410. The command signal sc comprises in particular the received command code cc: sc(cc), or even the technical data dt or command cmd decoded by the decoder 411 from the received command code cc: sc(dt), sc(cmd). The generator 412 provides the command signal sc to the transmitter 402 and/or to the transmitter device 40 intended for the second terminal 2 associated with the first terminal 1 that transmitted the command code cc to the management device 4.

In particular, the management device 4 comprises an associated terminal search engine 413 able to search for the second terminal 2 associated with the first terminal 1 that transmitted the command code cc to the management device 4, in particular in the base of associated terminals 42. The management device thus transmits the command signal sc to the second terminal 2 determined, by the search engine 413, as being associated with the first terminal 1 that transmitted the command code cc received by the management device 4. The search engine 413 in particular provides the transmitter 402, 40 of the command signal sc or the command signal generator 412 with the determined second terminal, for example in the form of an identifier of the second terminal idT2 or an address of the second terminal, etc.

In particular, the management device 4 comprises a command code manager 41. The command code manager comprises in particular one or more of the following devices:
  the command code extractor 410,
  the command code decoder 411,
  the command signal generator 412,
  the associated terminal search engine 413,
  the base of associated terminals 42.

The second terminal 2 comprises a receiver 201 for receiving a command signal sc from a command code management device 4. The command signal sc is based on a command code cc received by the command code management device 4 from a first terminal T1. The command code cc is received beforehand by the first terminal 1. The first terminal 1 and the second terminal 2 are associated prior to the first terminal 1 receiving a command code cc.

In particular, the second terminal 2 comprises a coupler 251 able to associate a first terminal 1 and a second terminal 2, forming associated terminals atx, and to transmit the associated terminals atx to a command code management device 4 prior to the first terminal 1 receiving a command code cc.

In particular, the receiver 201 is able to receive, in addition to the command signal cc from the management device 4, the control process ttc from the management device 4.

In particular, the second terminal comprises a transmitter 202. The transmitter 202 is able to transmit for example a control process load request dwld_rq(ttc) to the management device 4, and/or the associated terminals atx to the management device 4.

The second terminal 2 in particular comprises a transmitter device 20 comprising the transmitter 202 and the receiver 201.

In particular, the second terminal 2 comprises an installer 252 for installing the received control process ttc, then allowing the second terminal 2 to implement the control process ttc by way of a process processor 21, 221.

In particular, the second terminal comprises a user input interface 250a able to receive an interaction of a user U comprising data relating to at least one first terminal, in particular identifiers or an address of terminals idT1, {idTx}x, to be associated with the second terminal 2, or even with one or more additional second terminals to be associated with the first terminal and with the second terminal implementing a coupler 251.

In particular, the second terminal 2 comprises a user output interface 250r able to reproduce a request to provide terminals to be associated $id_{tx}\_rq$ to a user U of the second terminal 2. The user input interface 250a is triggered by the user output interface 250r reproducing a request to provide terminals to be associated, to which the user U responds when interacting by way of the user output interface 250r of the second terminal 2.

In particular, the second terminal 2 comprises an installation interface 25 for the remote use of command codes, able to install the implementation, by a process processor 21, 221, of a control process for the second terminal 2 by way of a command code cc read by a terminal, called first terminal 1, separate from the second terminal 2 and to associate the second terminal 2 with a first terminal 1. The installation interface 25 comprises in particular one or more of the following devices:
  the user input interface 250r;
  the user output interface 250a;
  the terminal coupler 251 providing the associated terminals atx;
  the installer 252 for installing the received control process ttc.

The installation interface 25 for the remote use of command codes communicates, by way of the transmitter 202 and/or of the receiver 201 and/or of the transmitter device 20, with the command code management device 4, in particular in order to transmit the associated terminals atx, in particular the identifiers of the associated terminals atx= ([idTx]), atx=($id_{T1}$,$id_{T2}$), and receive the control process ttc.

In particular, the second terminal 2 comprises an extractor 210 for extracting the content of the command signal sc received from the management device 4, in particular the command code cc, technical data dt, and the command cmd.

In particular, the second terminal 2 comprises a command code cc decoder 211. The received command signal sc comprises the command code cc transmitted beforehand by the first terminal T1 to the command code management device 4. The command code decoder 211 of the second terminal 2 provides in particular the one or more technical data dt encoded in the command code cc, in particular a command cmd. The decoder 211 is implemented when the command signal sc received by the second terminal 2 associated with the first terminal 1 that received (captured, read) the stored, reproduced, displayed command code cc comprises the command code cc: sc(cc). In particular, the decoder 211 comprises a retriever (not illustrated) for retrieving a command cmd on the basis of the command code cc or the technical data dt included in the command code from a command base (not illustrated).

In particular, the second terminal 2 comprises a generator 212 (not illustrated) for generating a command cmd on the basis of the technical data. The command generator 212 is implemented when the command signal sc received by the second terminal 2 associated with the first terminal 1 that received (captured, read) the stored, reproduced, displayed command code cc comprises technical data such as an Internet address, a connection identifier, etc.: sc(dt). In particular, depending on the type of technical data, the process implemented by the second terminal 2 and/or the component of the second terminal 2 to be commanded is possibly determined using the technical data dt and then, where appropriate, a command cmd is generated based on the technical data dt and/or on the process or component to be commanded.

In particular, the second terminal 2 comprises a controller 21, 221 able to control the second terminal 2, in particular to control a process or a component 22 of the second terminal 2, on the basis of the received command signal sc. The controller 21, 221 of the second terminal 2 comprises for example one or more of the following devices:
- the extractor 210 for extracting content from the command signal;
- the command code decoder 211,
- the command generator 212.

The first terminal 1 comprises:
- a command code cc reader 11 able to receive a read command code, and
- a transmitter 10, 102 for transmitting command codes cc to a command code management device 4, the command code reader 11 commanding the command code transmitter 10, 102 upon receipt of a command code, the command code cc transmitted by the first terminal 1 triggering transmission, by the command code management device 4, of a command signal sc to a second terminal 2, the second terminal 2 having been associated with the first terminal 1 prior to the first terminal 1 receiving the command code cc.

The transmitter 10, 102 possibly sends a command code to the management device 4 in a first message mssg1(cc). In particular, the transmitter 10, 102 is also able to transmit a remote read process load request dwld_rq(ttlcc).

In particular, the first terminal 1 comprises a receiver 10, 101 able to receive data from the management device 4, in particular a remote command code read process ttlcc and possibly an installation signal for installing the remote read process ttlcc_ntf.

In particular, the receiver 10, 101 receives the remote read process ttlcc from the management device 4 following transmission, by the transmitter 10, 102, of a remote read process load request dwld_rq(ttlcc) to the management device 4.

Where applicable, when the receiver 10, 101 receives an installation signal ttlcc_ntf from the management device 4, the receipt of the installation signal triggers, possibly upon condition of validation by the user U of the first terminal, the transmitter 10, 102 to send a load request or load consent dwld_rq(ttlcc).

The first terminal 1 in particular comprises a transmitter device 10 comprising the transmitter 102 and the receiver 101.

The first terminal 1 in particular comprises a user input interface 150a able to receive an interaction of a user U comprising data relating to the read process, in particular load consent dwld_ok to load a remote read process ttlcc.

The first terminal 1 in particular comprises a user output interface 150p able to reproduce a proposition to load a remote command code read process dwld_p to a user U of the first terminal 1. The user input interface 150a is triggered by the user output interface 150p reproducing a load proposition dwld_p, to which the user U responds when interacting by way of the user output interface 150a of the first terminal 1.

In particular, the first terminal 1 comprises a load request generator 151 able to generate a remote read process load request dwld_rq(ttlcc). The load request generator 151 in particular generates and provides a load request dwld_rq (ttlcc) to the transmitter 10, 102, for example upon command from the user input interface 150a on the basis of the interaction of the user U, such as consent dwld_ok.

In particular, the first terminal 1 comprises a process installer 152 able to install a remote read process ttlcc received from the management device 4. The process installer 152, by installing the remote read process ttlcc, allows the first terminal to implement the remote read process ttlcc, in particular by way of the command code reader 11.

In particular, the first terminal comprises an installation interface 15 for installing a remote command code read operation able to install the implementation, by the reader 11, of a remote command code read process by the first terminal 1 intended to be used by a second terminal 2, associated with the first terminal 1, the first terminal and the second terminal being separate associated terminals. The installation interface 15 comprises in particular one or more of the following devices:
- the user input interface 150p;
- the user output interface 150a;
- the load request generator 151;
- the installer 152 for installing the received remote read process ttlcc.

The remote command code read installation interface 15 communicates, by way of the receiver 101 and/or of the transmitter 102 and/or of the transmitter device 10, with the command code management device 4, in particular in order to receive the remote read process ttlcc and transmit the command code cc.

In particular, the first terminal 1 comprises a receiver 111 for receiving a command code, able to receive a command code cc from an object 3.

In a first embodiment, the command code cc is contained in particular in an N-dimensional pictogram 30p reproduced on a third object 3 such as a document (poster; label affixed to an object such as an electronic device, product packaging, etc.; a related work: book, newspaper, magazine, etc.; etc.) or on a screen, in particular of a third object consisting of an electronic device, also called third terminal, such as a communication device: smartphone, television, etc. or a simple electronic display device: monitor, advertising screen, etc. The command code cc is then a graphical representation of a technical datum.

In this first embodiment, a command code reader 11 is a command code sensor 11 of the first terminal T1. The command code sensor 11 comprises the command code receiver 111. The sensor 11 is in particular a scanner, a photographic or video camera, etc. for capturing the pictogram 30p. The command code receiver 111 is then respectively a receiver for receiving a document resulting from the scan of the pictogram 30p, of an image resulting from the photographic or video capture of the pictogram 30p, etc. containing the command code cc included in the pictogram.

In a second embodiment, the command code cc is for example stored in a memory of a short-range communication device 30r (illustrated by FIG. 1), also called third terminal 3. Short-range communications are understood to mean near-field point-to-point communications generally of the order of a cm, such as those used by RFID, NFC, etc. technologies.

The command code cc stored in the short-range communication device 3 is in particular a graphic code, such as an N-dimensional pictogram.

In this second embodiment, the command code reader 11 is a data reader for reading data from a memory of a short-range communication device, also called third terminal 3 (for example an RFID or NFC tag/card, a smartphone equipped with a short-range communication interface, etc.) to which the first terminal 1 is connected via a short-range communication network 6. The command code reader 11 comprises the command code cc receiver 111. The command code receiver 111 is then a receiver 111 for receiving the command code stored in the memory 30r of the third terminal 3. In particular, the command code reader 11 comprises a transmitter 112 (not illustrated) for transmitting a read request rd_rq(not illustrated) to read the stored command code cc to the third terminal 3. The read request rd_rq is a request able to trigger sending, by a transmitter 302 (not illustrated) of the third terminal 3, of the command code cc stored in its memory 30r, in particular to the first terminal T1.

The command code cc received by the first terminal 1 is thus transmitted by the transmitter 10, 102 to the command code management device 4, in particular in the form of a first message comprising the command code msgg1($cc$) triggered by the transmitter 10, 102 being provided, by the command code reader 11, with the command code cc received by the command code reader 11 from the object 3.

The management device 4 communicates with the first terminal 1 via a communication network. The management device 4 communicates with the second terminal 2 via a communication network. In particular, the communication network between the management device 4 and the first terminal 1 is the same network as the one used between the management device 4 and the second terminal 2: the communication network 5.

In a first phase, called phase of associating terminals for remote reading of the use of command codes, for example, the second terminal 2 requests loading of a control process 1'.dwld_rq(ttc) to the management device 4, in particular by way of a transmitter 20, 202. In this case, the management device 4 receives the control process load request 1'.dwld_rq (ttc) from the second terminal 2, in particular by way of a receiver 40, 401. In particular, the receipt of the control process load request 1'.dwld_rq(ttc) by the second terminal 2, in particular the receiver 20, 201, triggers 2'.em_trg(ttc) transmission, loading of the control process by the management device 4 to the requesting second terminal 2, by triggering for example a loader 45 and/or a transmitter 40, 402. The loader 45 is thus commanded directly or indirectly by the control process load request 1'.dwld_rq(ttc) from the second terminal 2.

The process loader 45 provides 3'.ttc a control process to the second terminal 2, in particular by providing it to the transmitter 40, 402, which sends it 4'.ttc to the second terminal 2. In particular, the loader 45 retrieves the process ttc to be loaded on the second terminal 2 from the process base 46.

The requested control process ttc will subsequently allow the second terminal 2 to control a process or a component of the second terminal on the basis of a command code not read/captured by the second terminal 2 but received by the second terminal 2, the command code received by the second terminal 2 having been received (read/captured) remotely beforehand by a terminal separate from the second terminal 2, also called first terminal 1.

The second terminal 2 receives the control process 4'.ttc loaded by the management device 4, in particular by way of the receiver 20, 201. The received control process ttc is installed, in particular by the installer 252, on the second terminal 2 in order to be implemented subsequently by the second terminal 2, in particular by a process processor 21, 201.

The receiver 20, 201, upon receiving the control process 5'.ttc, possibly triggers a user output interface 250r that reproduces a request for terminals to be associated 6'.id$_{Tx\_}$rq to the user U.

In particular, the receiver 20, 201, upon receiving the control process 5'.ttc, or even the user output interface 250r, upon reproducing the request for terminals to be associated, triggers a user input interface 250a that receives, from the user U, data relating to at least one first terminal, such as an identifier of a first terminal 7'.idT1, {idTx}$_x$.

In particular, the receiver 20, 201, upon receiving the control process 5'.ttc, or even the user input interface 250a, upon receiving data relating to at least one first terminal, such as an identifier of a first terminal 7'.idT1, {idTx}$_x$, triggers the coupler 251, which associates the second terminal 2 with at least the first terminal 1, in particular indicated by the user U by way of the user input interface 250a. The coupler 251 then provides the associated terminals resulting 8'.atx from this association of the second terminal with at least the first terminal 1 to the management device 4, in particular by way of the transmitter 20, 202: 9'.atx.

The management device 4 receives the associated terminals 9'.atx, in particular by way of the receiver 40, 401. In particular, the register 47 for registering associated terminals atx comprising the first terminal 1 and the second terminal 2 receives the associated terminals 10'.atx from the second terminal 2, in particular via the receiver 40, 401. The management device 4 or even the register 47 possibly registers, stores 11'.atx the associated terminals atx received from the second terminal 2, in particular in the base of associated terminals 42.

In particular, the management device 4 comprises a notifier 48 for making available a read process ttlcc to a first terminal 1 in the associated terminals 10'.atx, 11'.atx received from the second terminal 2. The notifier 48 in particular provides an installation signal 12'.ttlcc_ntf for installing a read process to the first terminal 1. The notifier 480 possibly provides the installation signal 12'.ttlcc_ntf to a transmitter 40, 402 sending the installation signal 13'.ttlcc_ntf to the first terminal 1.

In particular, the management device 4 comprises an extractor 480 for extracting a first terminal 1 from the associated terminals 10'.atx, 11'.atx received from the second terminal 2. Where applicable, the extractor 480 extracts the identifier of the first terminal id$_{T1}$. The loader 45 thus provides a remote read process, or even where applicable the notifier 48 and/or an installation signal generator 481 provides an installation signal to the first terminal 1 extracted from the associated terminals atx received from the second terminal 2.

In particular, the management device 4 comprises an installation signal ttlc_ntf generator 481. The generator 481 provides the installation signal 12'.ttlcc_ntf to the transmitter 40, 402 intended for the first terminal 1 of the associated terminals atx. The installation signal ttlcc_ntf allows the command code management device 4, in particular the loader 45, to load a read process ttlcc to the first terminal 1.

The notifier 48 in particular comprises the extractor 480 and/or the installation signal generator 481.

In particular, the first terminal 1, in particular the receiver 10, 101, receives the installation signal 13'.ttlcc_ntf from the management device 4, in particular directly or indirectly from the notifier 48 and/or from the installation signal generator 481. Upon receipt of the installation signal 13'.ttlcc_ntf, the receiver 10, 101 triggers, possibly upon condition of validation by the user U of the first terminal, the transmitter 10, 102 to send a load request or load consent 18'.dwld_rq(ttlcc).

The receiver 10, 101, upon receiving the installation signal 13".ttlcc_ntf, possibly triggers a user output interface 150*p* that reproduces a proposal to install a read process 15'.*dwld*_p to the user U.

In particular, the receiver 10, 101, upon receiving the installation signal 13".ttlcc_ntf, or even the user output interface 150*p*, upon reproducing the installation proposition, triggers a user input interface 150*a* that receives, from the user U, data relating to the read process loading, in particular loading consent 16'.*dwld*_ok.

In particular, the receiver 10, 101, upon receiving the installation signal 13".ttlcc_ntf, or even the user input interface 150*a*, upon receiving data relating to the read process loading, in particular loading consent 16'.*dwld*_ok, triggers the requester 151, which asks 17'.*dwld*_rq(ttlcc) the management device 4 to load the read process on the first terminal 1. The requester 151 then provides the request 17'.*dwld*_rq(ttlcc) resulting from the response from the user 16'.*dwld*_ok, in this case a load request when the response is loading consent, to the management device 4, in particular to the transmitter 10, 102, which sends the provided request 18'.*dwld*_rq(ttlcc) to the management device 4.

In particular, following the transmission of an installation signal 13'.ttlc_ntf by the management device 4, in particular by the transmitter 40, 402, possibly generated beforehand by the installation signal generator 481, the management device 4, in particular the receiver 40, 401, receives the remote read process load request 18'.*dwld*_rq(ttlcc) from the first terminal 1.

The management device 4, in particular the receiver 40, 401, triggers the loading of the read process ttlcc, in particular the loader 45, which then loads the read process ttlcc, to the first terminal 1 associated with the second terminal in the received associated terminals 10'.*atx*, in particular upon receiving the remote read process load request 18'.*dwld*_rq (ttlcc) from the first terminal 1. The loader possibly provides the read process 20'.ttlcc to the transmitter 40, 402, which sends the read process 21'.ttlcc to the first terminal 1.

The first terminal 1 receives the read process 21'.ttlcc loaded by the management device 4, in particular by way of the receiver 10, 101. The received read process ttlcc is installed, in particular by the installer 152, on the first terminal 1 in order to be implemented subsequently by the first terminal 1, in particular by a reader 11.

In a second phase called phase of using command codes, for example, the first terminal 1, in particular a reader 11 implementing in particular a read process installed in the previous association phase, reads 1.*cc* a command code 30*p* from an object 3. In particular, the reader 11 provides the read command code 2.*cc*, 2.*mssg*1(*cc*) to the management device 4, in particular in a first message 2.*mssg*1(*cc*). The transmitter 10, 102 sends 2.*cc*, 2.*mssg*1(*cc*) the read command code cc from the reader 11 to the management device 4.

The management device 4, in particular the receiver 40, 401, receiving the command code 2.*cc*, 2.*mssg*1(*cc*) from the first terminal 1, the management device 4, in particular the command code manager 41 and/or the associated terminal search engine 413, determines the second terminal 2 on the basis of the first terminal 1 that transmitted the command code, in particular from the base of associated terminals 42. The management device 4, in particular the transmitter 40, 402, then transmits a command signal 6.*sc*(*cc*), sc(cmd), sc(dt) based on the received command code to the second terminal 2 thus determined.

In particular, the command code extractor 410 extracts a command code cc from the first message 2.*mssg*1(*cc*) received from the first terminal 1. The command code extractor 410 in particular receives the first message 3.*mssg*1 (*cc*) comprising the command code from the receiver 401 or from the transmitter device 40 that received the first message 2.*mssg*1(*cc*).

In particular, the command code decoder 411 decodes the command code 2.*cc* received by the management device 4, in particular by way of the receiver 401 and/or the transmitter device 40, or even extracted 4*a*.cc from a received first message 3.*mssg*1(*cc*), in particular by the command code extractor 410. The decoder 411 determines technical data 4*b*.dt, or even a command 4*b*.cmd, on the basis of the command code 2.*cc*, 2.*mssg*1(*cc*) received by the management device 4.

In particular, the command signal sc generator 412 for generating a command signal on the basis of the command code 2.*cc*, 2.*mssg*1(*cc*) received by the management device 4, in particular by way of the receiver 401 and/or the transmitter device 40, or even extracted 4*a*.cc from a received first message 3.*mssg*1(*cc*), in particular by the command code extractor 410. The command signal sc comprises in particular the received command code cc: 5.*sc*(*cc*), or even the technical data dt or command cmd decoded by the command code decoder 411 for decoding the received command code cc: 5.*sc*(*dt*), sc(cmd). The generator 412 provides the command signal 5.*sc* to the transmitter 402 and/or to the transmitter device 40 intended for the second terminal 2 associated with the first terminal 1 that transmitted the command code cc to the management device 4.

The management device 4 thus transmits a command signal 6.*sc*(*cc*), sc(cmd), sc(dt) to the second terminal 2 based on the read command code sent 2.*cc*2.*mssg*1(*cc*) by the first terminal 1 to the management device 4, the second terminal 2 and the first terminal 1 having been associated beforehand: atx.

In particular, the extractor 210 extracts the content of the command signal 6.*sc* received from the management device 4, in particular a command code cc, technical data dt, and a command cmd. The command signal received 6.*sc* by the second terminal 2 is in particular received by the receiver 20, 21 and provided to the extractor 210.

In particular, the command code cc decoder 211 decodes either the command code from the received command signal 6.*sc*(*cc*) or the command code cc extracted by the extractor 210 of the 6.*sc* terminal 2 from the received command signal sc. The decoder 211 then provides either technical data dt to the command generator 212, the command generator 212 providing 7.cmd a command generated on the basis of the technical data dt to the controller 21, 221, or the command 7.*cmd* to the controller 21, 221 in order to command the second terminal 2, in particular the component 22, on the basis of the command code cc read by the first terminal 1.

Figure 4A:
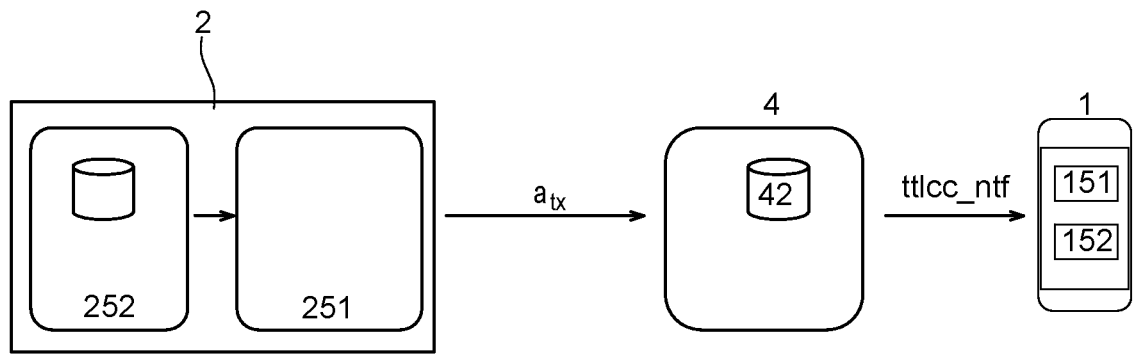
FIG. 4a shows a simplified drawing of the registration of an association of terminals prior to the use of command codes according to the invention.

FIG. 4*a* illustrates a simplified drawing of the registration of an association of terminals prior to the use of command codes according to the invention.

The second terminal 2, in particular a control process installer 252, installs a control process ttc using a command code, in particular a 2D code. It does this in particular when installing the control process.

One embodiment of the control process is a control application implemented by a processor of the second terminal 2. The control application, when it is implemented by the processor of the second terminal 2, performs the steps of the control method PCTx, in particular as illustrated by FIG. 1.

In particular, the installer 252 triggers the coupler 251, by way of which the second terminal provides the associated terminals atx during the installation of the control process. The coupler 251 receives the first terminal 1 and at least one second terminal 2, in particular in the form of data relating to the second terminal 2 in which the coupler 251 is implemented: for example an identifier of the second terminal 2 and/or an identifier of the process/application of the second terminal $id_{app\_PC}$, and data relating to associated terminals, in particular to a first terminal 1, such as a smartphone: telephone number of the first telephone, or even to other second terminals, such as a smartphone: telephone number, etc., a connected object: identifier of a first connected object IoT1, of a second connected object IoT2, etc.

The second terminal 2 provides the associated terminals atx in particular in the form of an installation request for the associated terminals, in particular a secure request such as: https://[id-pc]/[id-msisdn]/[id-app-pc]/server-qr-code-pc-.com, in which id-pc is an identifier of the second terminal 2, id-msisdn is an identifier of a first terminal 1, id-app-pc is an identifier of the control process or control application installed on the second terminal 2 and server-qr-code-pc-.com indicates requesting of the implementation of the association by the management device 4, in particular a service provider server, receiving the associated terminals atx.

Following the receipt of the associated terminals atx by the management device 4, the management device sends, to the associated first terminal 1 of the associated terminals atx, an installation signal ttlcc_ntf, also called download notification.

The first terminal 1 of the associated terminals thus receives the download notification. This triggers, possibly following validation by the user, installation on the first terminal 1 of a remote read process, in particular in the reader 11 or in the form of a read application that, when it is executed by the reader 11, implements the steps of the read method, for example as illustrated by FIG. 1.

The reader 11 of the first terminal 1 implementing the read process according to the invention then makes it possible to scan/capture/read a command code that will be used not on the first terminal 1 but on the second terminal 2.

Figure 4B:
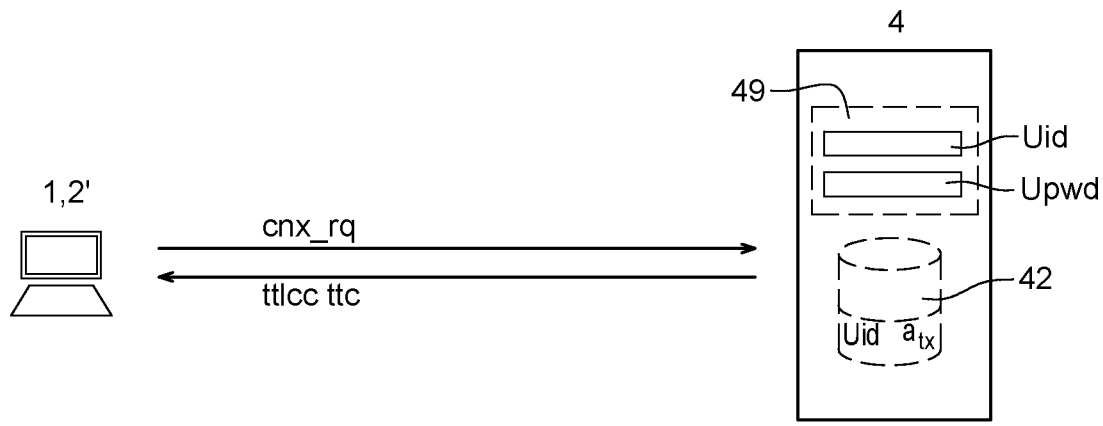
FIG. 4b shows a simplified drawing of the addition of a second terminal to a registration of an association of terminals prior to the use of command codes according to the invention.

FIG. 4b illustrates a simplified drawing of an addition of a second terminal to a registration of an association of terminals prior to the use of command codes according to the invention.

The first terminal 1 or another second terminal 2' connects to the management device 4, in particular to a user account comprising associated terminals in order to remotely use a command code. The connection to the user account is possibly authenticated, in particular by an authentication device 49 receiving a user identifier Uid and a user password Upwd.

The connection of the first terminal 1 or other second terminal 2' is triggered in particular by this first terminal 1, second terminal 2', sending a connection request cnx_rq. The connection request cnx_rq comprises in particular an identifier of the terminal and/or the requested process: in the form for example of a read process load request or of a control process load request. The connection request is in particular formulated as follows: https:/app/plug-in/id/password/xxxxx.com. In this example, the process is requested in the form of a browser plug-in, that is to say that the process will be installed in an Internet browser in order to be implemented by the browser.

If the authentication device 49 determines that the user password Upwd received in the connection request cnx_rq from the new terminal 1, 2' corresponds to the password registered to the user account associated with the received user identifier Uid, then the management device, where applicable, adds the requesting terminal 1, 2' to the associated terminals atx of the user account Uid, and then loads the appropriate process, specifically a read process to a first terminal 1 or a control process to a second terminal 2'.

When loading the process ttlcc, ttc from the management device 4 to the terminal 1, 2', the loading is performed in particular in the following form: https://download/app/ID_account/xxxxxx.com. The process loaded on the terminal 1, 2' in particular comprises an identifier of the user account in which the terminal 1, 2' is associated with the second terminal that was used to install the user account.

Figure 4C:
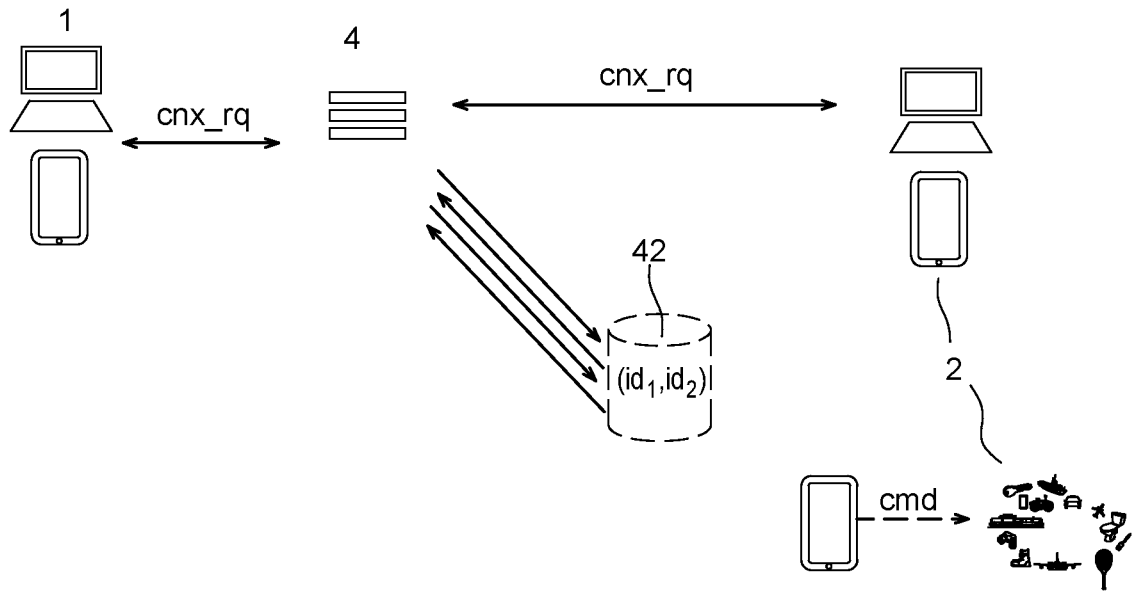
FIG. 4c shows a simplified drawing of connection of a first terminal and a second terminal to a command code management device prior to the use of command codes according to the invention.

FIG. 4c illustrates a simplified drawing of connection of a first terminal and a second terminal to a command code management device prior to the use of command codes according to the invention.

In particular, in order to implement the invention, the terminals 1, 2 connect to the management device or server.

For example, the first terminal 1 connects to the management device 4, such as a server, in particular by way of a connection request, such as a websocket of the type mqtts: \\server1. For this purpose, the first terminal 1 identifies itself to the management device 4 by way of a first terminal identifier $id_{T1}$, such as an IMSI or SIM identifier of a mobile operator, or telephony MSISDN or through authentication by way of a code, in particular a PIN code or an identifier generated by the read process implemented by the first terminal 1 or a possibly encrypted alias, etc.

The read process is implemented in the first terminal 1, in particular by way of an application executed by a processor of the first terminal 1 or a plug-in installed in a browser of the first terminal 1.

In particular, the second terminal 2: computer, smartphone or connected object connects to the management device by way of a connection request, such as a websocket of the type mqtts: \\. For this purpose, the second terminal 2 identifies itself to the management device 4 by way of a second terminal identifier $id_{T2}$, such as an IMSI or SIM identifier of a mobile operator, or telephony MSISDN or through authentication by way of a code, in particular a PIN code or an identifier generated by the read process implemented by the first terminal 1 or a possibly encrypted alias, etc.

The control process is implemented in the second terminal 2, in particular by way of an application executed by a processor of the second terminal 2 or a plug-in installed in a browser of the second terminal 2.

The connected objects 2 are in particular objects in the Internet of Things without a user interface that are controlled in particular by another terminal, such as a mobile telephone, via a local area network using in particular Bluetooth technology.

The management device 4 is aware of the associated first and second terminals 1, 2 since it stored them in particular in a base of associated terminals 42, in particular by storing pairs of identifiers ($id_{T1}$, $id_{T2}$) of associated terminals. Thus, when the first and second terminals 1, 2 connect to the management device 4, the first and second terminals 1, 2 are paired via the management device.

The connection of the first terminal prior to the transmission of a command code received by the first terminal 1 makes it possible, if the second terminal is not connected to the management device 4 when the command code is transmitted from the first terminal 1 to the management device, to trigger storage of the command code provided by the first terminal 1 to the management device 4 in the user account. Thus, when the second terminal connects to the management device, the management device checking the user account in particular in order to authorize connection detects a stored command code, reads it and sends it to the second terminal 2 that has just connected.

Therefore, not only is a command code read on a first terminal remote from the second terminal that will use the command code, but the reading is also carried out by the first terminal 1 at a time $t_l$ decorrelated from the time $t_u$ of use by the second terminal. Decorrelated and/or remote time is understood to mean a time that is not dependent on the read time and on the transmission periods, which may be far from the read time. This allows the user in particular to capture, scan and read a command code while walking around outside their home, in particular by way of their smartphone, but to wait until they are home or at the office to implement the command code, for example on their laptop or desktop computer or even on their connected television set, etc.

FIG. 5 illustrates a simplified drawing of a transfer of a command code from a first terminal to a second terminal according to the invention.

In particular, the management device comprises a base of associated terminals storing identifiers relating to the first terminal, in particular the reader identifier of the first terminal $id_{App\_A}$, and identifiers relating to one or more second terminals, in particular the controller identifier of the second terminal $id_{App\_B}, \ldots id_{App\_n}$.

The first terminal 1 transmits a command code received by the first terminal 1 from an object 3 (cf. FIG. 1) to the management device 4, in particular in a first message mssg1(*cc*). The first message 1 is in particular formulated as follows: mqtt Publish (topic appA/aapB).

The management device 4 then transmits a command signal sc based on the received command code to the second terminal. Either the management device directly transmits the command code in the command signal sc to the second terminal, which will decode and control the second terminal on the basis of the command code. Or the management device 4 comprises a command code decoder and transmits a command based on the decoded command code to the second terminal 2, in particular when the management device is an intermediation server for connected objects.

In one particular embodiment, a command code read by a first terminal may simultaneously address multiple second terminals, and in particular multiple connected objects or IoT clients. Thus, one and the same command code read by the first terminal may be used by the management device 4 to transmit commands to multiple connected objects 2.

Possibly, prior to the implementation of the invention, that is to say to the transfer of the command code from a first terminal 1 to a second terminal 2, the first terminal 1, in particular the plug-in of a browser of the first terminal 1, connects to the management device 4 or server by way of a connection request cnx_rq, such as a websocket http://, by providing an identifier of the first terminal 1.

And, the second terminal 2, in particular the plug-in of a browser of the second terminal 2, connects to the management device 4 or server by way of a connection request cnx_rq, such as a websocket mqtt subscribe (topic AppA/AppB), by providing an identifier of the second terminal 2.

FIGS. 6*a* to 6*d* illustrate simplified drawings of various implementations for transferring a command code. In these examples, the command code cc is a 2-dimensional pictogram, also called 2D code, such as a QR code. Nevertheless, these illustrations are not limited to 2-dimensional pictogram codes.

FIG. 6*a* illustrates a simplified drawing of a transfer of a command code comprising an Internet address from a first mobile terminal to a second computer terminal implementing a device/application for receiving and decoding the command code according to the invention.

The first terminal 1, in this case a mobile terminal, in particular by way of a read application implemented by the first terminal 1, captures a command code and sends it in a first message mssg1(*cc*) to the management device 4, in particular in the following form: mqtts://[id-pc]/[id-msisdn]/[id-app-mobile]/code-2D/server-code-2D-pc.com, the management device 4 then being called "server-code-2D-pc" therein.

The management device 4 then transmits sc(cc) the command code received from the first terminal 1 to the second terminal 2, in this case a computer comprising a controller 21, in particular a control application implemented by the second terminal 2 and a component 22 able in particular to reproduce a multimedia content item whose address is formed by a link resulting from the decoding of the command code. The controller 21 comprises in particular a command code decoder and is possibly able to control the component 22 by way of the decoded command cmd.

The transmission of the command code between the management device 4 and the second terminal 2, in particular the controller 21, is in particular formulated as follows: mqtts://[id-pc]/[id-msisdn]/[id-app-pc]/code-2D.

FIG. 6*b* illustrates a simplified drawing of a transfer of a command code comprising an Internet address from a first mobile terminal to a second computer terminal implementing an Internet browser comprising a device/plug-in for receiving and decoding the command code according to the invention.

The first terminal 1, in this case a mobile terminal, in particular by way of a read application implemented by the first terminal 1, captures a command code and sends it in a first message mssg1(*cc*) to the management device 4, in particular in the following form: mqtts://[id-pc]/[id-msisdn]/[id-app-mobile]/code-2D/server-code-2D-pc.com, the management device 4 then being called "server-code-2D-pc" therein.

The management device 4 then transmits sc(cc) the command code received from the first terminal 1 to the second terminal 2, in this case a computer comprising a browser 22 comprising a control plug-in 221 based on this command code. The control plug-in 221 comprises in particular a command code decoder and is possibly able to control the browser 22 by way of the decoded command cmd.

The transmission of the command code between the management device 4 and the second terminal 2, in particular the browser 22, is in particular formulated as follows: mqtts://[id-pc]/[id-msisdn]/[id-plug-in-pc]/code-2D.

FIG. 6*c* illustrates a simplified drawing of a transfer of a command code from a first mobile terminal to a second mobile terminal implementing a device/application for receiving and decoding the command code according to the invention.

The first terminal 1, in this case a mobile terminal, in particular by way of a read application implemented by the first terminal 1, captures a command code and sends it in a first message mssg1(*cc*) to the management device 4, in particular in the following form: mqtts://[id-msisdn]/[id-app-mobile]/code-2D/server-code-2D-pc.com, the management device 4 then being called "server-code-2D-pc" therein.

The management device 4 then transmits sc(cc) the command code received from the first terminal 1 to the second terminal 2, in this case another mobile terminal, in particular to a control application implemented by the second terminal 2. The transmission of the command code between the management device 4 and the second terminal 2 is in particular formulated as follows: mqtts://[id-pc]/[id-msisdn]/[id-app-pc]/code-2D. The second terminal 2, in particular the control application, decodes the command code received from the management device 4 and reproduces the result of the decoding.

FIG. 6*d* illustrates a simplified drawing of a transfer of a command code from a first mobile terminal to a second connected object terminal, the command code management device comprising a mediation server for the Internet of Things for commanding the connected objects on the basis of the command code according to the invention.

The first terminal 1, in this case a mobile terminal, in particular by way of a read application implemented by the first terminal 1, captures a command code and sends it in a first message mssg1(*cc*) to the management device 4, in particular in the following form: mqtts://[id-msisdn]/[id-iot]/[id-app-mobile]/code-2D/server-code-2D-pc.com, the management device 4 then being called "server-code-2D-pc" therein.

The management device 4 then decodes the command code received from the first terminal 1, and then transmits sc(cmd) the decoded command cmd to the second terminal 2, in this case a connected object. The transmission of the command code between the management device 4 and the second terminal 2 is in particular formulated as follows: mqtts://[id-iot]/[IoT command]. The second terminal 2 executes the received command.

The invention also targets a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term module may correspond equally to a software component or to a hardware component. A software component corresponds to one or more computer programs, one or more subroutines of a program or, more generally, to any element of a program or of software that is capable of implementing a function or a set of functions in accordance with the above description. A hardware component corresponds to any element of a hardware assembly that is

The invention claimed is:

1. A command code management method, implemented by a command code management device, comprising:
   receiving, by the management device, a command code from a first terminal, the command code the resulting from a coding of a command;
   determining a second terminal that is associated with the first terminal for command code management with the first terminal based on the received command code;
   generating a command signal based on the received command code that includes the command; and
   transmitting the command signal from the management device to the second terminal for execution of the command of the command code and for displaying a result of an execution of the command of the command code, the command code having been received by the first terminal prior to the transmitting of the command signal and after associating the first terminal and the second terminal,
   wherein the first terminal, the second terminal and the management device are separate devices.

2. The command code management method as claimed in claim 1, wherein generating the command signal comprises decoding the received command code.

3. The command code management method as claimed in claim 1, wherein the command code comprises a pictogram command code.

4. A non-transitory computer readable medium comprising instructions stored thereon which when executed by a processor of a command code management device configure the command code management device to implement a method comprising:
   receiving, by the management device, a command code from a first terminal, the command code resulting from a coding of a command; and
   determining a second terminal that is associated with the first terminal for command code management with the first terminal based on the received command code;
   generating a command signal based on the received command code that includes the command; and
   transmitting the command signal from the management device to the second terminal for execution of the command of the command code and for displaying a result of an execution of the command of the command code, the command code having been received by the first terminal prior to the transmitting of the command signal and after associating the first terminal and the second terminal,
   wherein the first terminal, the second terminal and the management device are separate devices.

5. A command code management device, comprising:
   a receiver configured to receive a command code from a first terminal, the command code resulting from a coding of a command;
   a processor configured to:
      determine a second terminal that is associated with the first terminal for command code management with the first terminal based on the received command code; and
      generate a command signal based on the received command code that includes the command; and
   a transmitter configured to transmit the command signal from the command code management device to the second terminal for execution of the command of the command code and for displaying a result of an execution of the command code after receiving the command code from the first terminal and after associating the first terminal and the second terminal,
   wherein the first terminal, the second terminal and the management device are separate devices.

6. The command code management device as claimed in claim 5, comprising:
   a process loader, configured to load a control process to the second terminal and a remote read process to the first terminal; and
   a register configured to register associated terminals, comprising the first terminal and the second terminal, wherein the processor determines the second terminal that is associated with the first terminal using the register.

7. The command code management device as claimed in claim 6, wherein the process loader is configured to trigger a transmission by the second terminal to the command code management device when loading the control process to the second terminal.

8. The command code management device as claimed in claim 6, wherein the transmitter is configured to transmit an installation signal to the first terminal, the installation signal making it possible for the command code management device to load a remote read process to the first terminal.

9. A second terminal that has been associated for command code management with a first terminal from which a command code is received by a command code management device, the second terminal comprising:
    a receiver configured to receive a command signal, which is based on the command code, from the command code management device, the command code resulting from a coding of a command received by the first terminal prior to the reception of the command signal and after the association of the first terminal and the second terminal; and
    a processor configured to obtain the command from the command signal and execute the command,
    wherein the first terminal, the second terminal and the management device are separate devices.

10. The second terminal as claimed in the claim 9, comprising a coupler configured to associate the first terminal and the second terminal to form associated terminals, and to transmit a signal representative of identities of the associated terminals to the command code management device prior to the first terminal receiving the command code.

11. A first terminal comprising:
    a command code reader configured to receive a command; and
    a command code transmitter for transmitting a command code, which is a coding of the command, to a command code management device,
    wherein:
        the command code reader commanding the command code transmitter upon receipt of the command code; and
        the command code transmitted by the first terminal being configured to trigger transmission, by the command code management device, a command signal, which is based on the command code, to a second terminal for execution of the command of the command code and for displaying a result of an execution of the command;
        the second terminal being associated with the first terminal for command code management;
        the command code having been received by the first terminal prior to the transmission of the command code by the first device and after the association of the first terminal and the second terminal; and
    the first terminal, the second terminal and the management device are separate devices.

* * * * *